Figure 1:
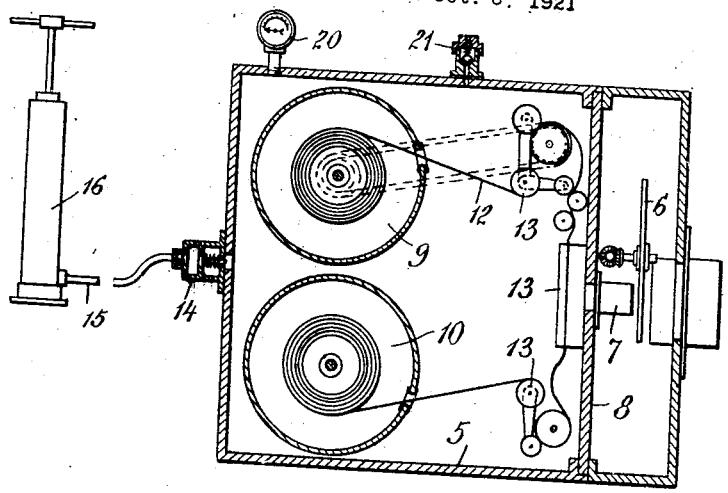

June 10, 1924.

A. S. McDANIEL 1,497,457

MANIPULATION OF PHOTOGRAPHIC MATERIAL

Filed Oct. 8, 1921

INVENTOR
Alonzo S. McDaniel, by
Pennie, Davis, Marvin & Edmonds,
ATTORNEYS.

Patented June 10, 1924.

1,497,457

UNITED STATES PATENT OFFICE.

ALONZO S. McDANIEL, OF NEW YORK, N. Y.

MANIPULATION OF PHOTOGRAPHIC MATERIAL.

Application filed October 8, 1921. Serial No. 506,341.

*To all whom it may concern:*

Be it known that I, ALONZO S. McDANIEL, a citizen of the United States, residing at 434 West 120th St., New York city, in the county of New York, State of New York, have invented certain new and useful Improvements in the Manipulation of Photographic Material; and I do hereby declare the following to be a full, clear, and exact description of the invention, such as will enable others skilled in the art to which it appertains to make and use the same.

This invention relates to a method and an apparatus for preventing the formation of markings commonly known as "static markings" on a photographic element such as a motion picture film.

In working with motion picture films, when they are still in a light sensitive condition, it has been found that when the film is being manipulated as for example when a negative film is being run through the camera for taking the picture, or when a positive and a negative are being run through a printing machine, that so-called static markings are developed, thought by some to be due to electricity developed by the friction or contact between the celluloid of the film and other parts of the apparatus or between different parts of the film itself. This static electricity according to this explanation gives rise to electrical discharges which produce on the films after development what are known as "static markings" and these markings are the cause of the loss of a great deal of film in the motion picture industry.

I have found that a motion picture film or any similar light-sensitive material, together with surrounding or neighboring objects, such as the mechanical parts of a motion picture camera, printing machine, slitting machine, perforating machine and the like, comprising a number of conductors and dielectrics, constitutes as a whole a system which seems to behave very much like a number of condensers some of which are electrically connected in series and others in parallel. As the film or light-sensitive material is moved relatively to the other parts of the system, electrical stresses or potential gradients are set up, I believe in the different dielectric materials of the system (since the different portions of the system ordinarily carry charges of electricity acquired through contact, friction, ionized air, or from other causes) and when these electrical stresses or potential gradients become greater than the dielectric strength of the material in which they are set up, an electrical discharge of some kind occurs. This discharge may be, I believe, a visual corona discharge, a disruptive discharge, a so-called silent or invisible corona discharge or any other type or kind of discharge known by various names. Any of these different kinds of discharges it is thought are apt to produce a latent image of some kind on the sensitized film and after development of these latent images, markings of various configurations and densities are produced from these latent images on the film. The direct cause of these markings is probably the electrical discharge itself and not the light resulting from the discharge, since bad markings seem to result when no light is visible to the unaided eye.

Now I have found further that these discharges occur for the most part in the gaseous portions of the system of dielectrics mentioned above. These gaseous portions or gaseous dielectrics ordinarily consist of ordinary air, but solvent vapors and gaseous decomposition products of the film support or celluloid or mixtures of these vapors or decomposition products with air may sometimes constitute a separate part of the system of dielectrics. These gaseous dielectrics ordinarily envelop the film or photographic element but sometimes they occur as bubbles within the emulsion or support or between the layers of the emulsion and the support.

One of the main features of my invention consists in the provision and application of means for increasing the dielectric strength of these dielectrically weaker parts of the system so that they are enabled to withstand the increased or fluctuating dielectric stresses or potential gradients produced in them by movements of the film relative to other parts of the system or by any other cause which produces or tends to produce excessive potential gradients in these gaseous parts of the system. I accomplish the foregoing desirable result by increasing the density of these gaseous portions of the system preferably by enclosing the film or other photographic element in a substantially gas-tight housing or container and then introducing a gas under pressure into this container or housing. The compressed gas thus introduced entirely envelops the film or photographic element thus increasing the density of the gas surrounding the film and compressing the gas in the bubbles in the film by compressing the confining walls of the bubble. The compressed gas also penetrates into the interstices between the emulsion and support and the other parts of the film and mingles with the gases already present in these interstices. Thus the treatment with compressed gas increases the density of each of the different gaseous portions of the entire system of dielectrics thereby correspondingly increasing the dielectric strength thereof so that they are able to withstand the increased potential gradients which ordinarily would cause them to partially or wholly break down giving rise, I believe, to the objectionable electrical discharges and the static markings resulting therefrom after development of the photographic element.

Another of the main features of my invention consists in the provision of means for dissipating the electrical charges on the film thus tending to prevent the charges from accumulating to such an extent as to increase the potential gradient to a point where discharges would occur. This is accomplished by using moist or humid compressed gas. The larger amount or concentration of water vapor contained in the compressed gas seems to increase the leakage of the charges along the surfaces of the dielectrics and conductors without actually condensing thereon.

One of the advantages of my invention is the means it affords for conveniently using motion picture film which has been subjected to desiccation or equivalent treatment in order to increase its keeping qualities and speed. Hitherto it has not been practicable to use motion picture film treated in this way because of its high degree of susceptibility toward static. The present invention, of course, makes the use of such film an easy matter. Similarly ordinary film or even defective film may be used in very dry or very cold climates without danger of "static" if the present invention is utilized.

Furthermore, in the manufacture of motion picture film, the modification or adjustment of the structure and composition of the film so as to reduce its susceptibility toward static without loss of desirable photographic and keeping qualities has constituted one of the principal difficulties of the manufacturing process. The application of the present invention in connection with the manufacturing process makes it wholly unnecessary to make modifications of this character in the film and the difficulties of manufacturing are thereby enormously lessened in this respect.

According to present practice, film is manipulated (during its manufacture or exposure as when making a negative with the camera or when making a positive from a negative film in a printing machine), under normal atmospheric conditions. I have found, however, as previously stated, that if the film during any of the above mentioned operations, is merely subjected to an excess pressure of air or other gas that such so-called static markings are effectively and completely prevented. That is to say, according to this invention, the film during manufacture or exposure, or during printing, as the case may be, is enclosed in a suitable substantially air tight container, which contains air or other gas under an excess pressure to give a gas of higher density than ordinary air.

The gas that I prefer to use and which, of course, is the simplest to use is compressed ordinary atmospheric air, although practically all other gases will work satisfactorily, excepting those gases which might have a corrosive or other dense detrimental effect on the film or other parts of the apparatus or which condense too readily or which contain too much moisture.

I have found that a pressure of 30 pounds per sq. in. as read on the ordinary pressure gauge, using atmospheric air, produces satisfactory results, and effectively prevents static markings with many films. With different gases or different films it may be advisable to use pressures greater or less than 30 pounds but the most suitable pressure in any instance can be determined readily by a few simple tests.

In regard to the moisture content of the compressed or dense gas used in the present invention, the tendency appears to be that the higher the moisture content the less the pressure that is necessary. However, it is usually advisable to keep the moisture content below the value at which liquid water is apt to separate from the gas at any temperature to which the film is likely to be exposed.

The preferred apparatus for carrying out the invention comprises a motion picture camera of very substantial construction and of course made substantially gastight. The lens with its focusing apparatus is preferably placed outside of the part of the camera that is subjected to the elevated gas pressure. The pressure compartment is, of course, provided with a door which will shut gas-tight and with means for carrying completely within itself two reels, one from which the unexposed film is unwound and the other on which the exposed film is wound. The pressure compartment is provided with a valve for connection to a gas pressure line. It is also provided with a pressure gauge and with a safety valve which preferably is adjustable so that it will blow off at any desired pressure.

Where the invention is applied to a printing machine the pressure compartment may be provided with means for carrying four reels, one each for the positive and negative before printing, and one each for the positive and negative after printing. In this case also the pressure compartment is provided with the two valves and a gauge as in the first case.

It is, of course, obvious that my invention may be applied to the film during the manufacture thereof for all that is necessary is that the film after coating with the sensitive emulsion shall thereafter be surrounded with a gas under pressure or other dense gas by any convenient means such as by constructing a gas tight housing around the appropriate part of the apparatus on which the coated film is being handled (for drying, slitting, perforating or reeling, etc.) and maintaining a gas under pressure or other dense gas in this housing.

In the accompanying drawings there is illustrated diagrammatically, possible forms of apparatus for carrying out the invention. It, of course, should be understood that the invention in its broader aspects is not confined to any particular apparatus and that the accompanying drawings are intended only to illustrate two forms of apparatus which may be used.

Figure 2:
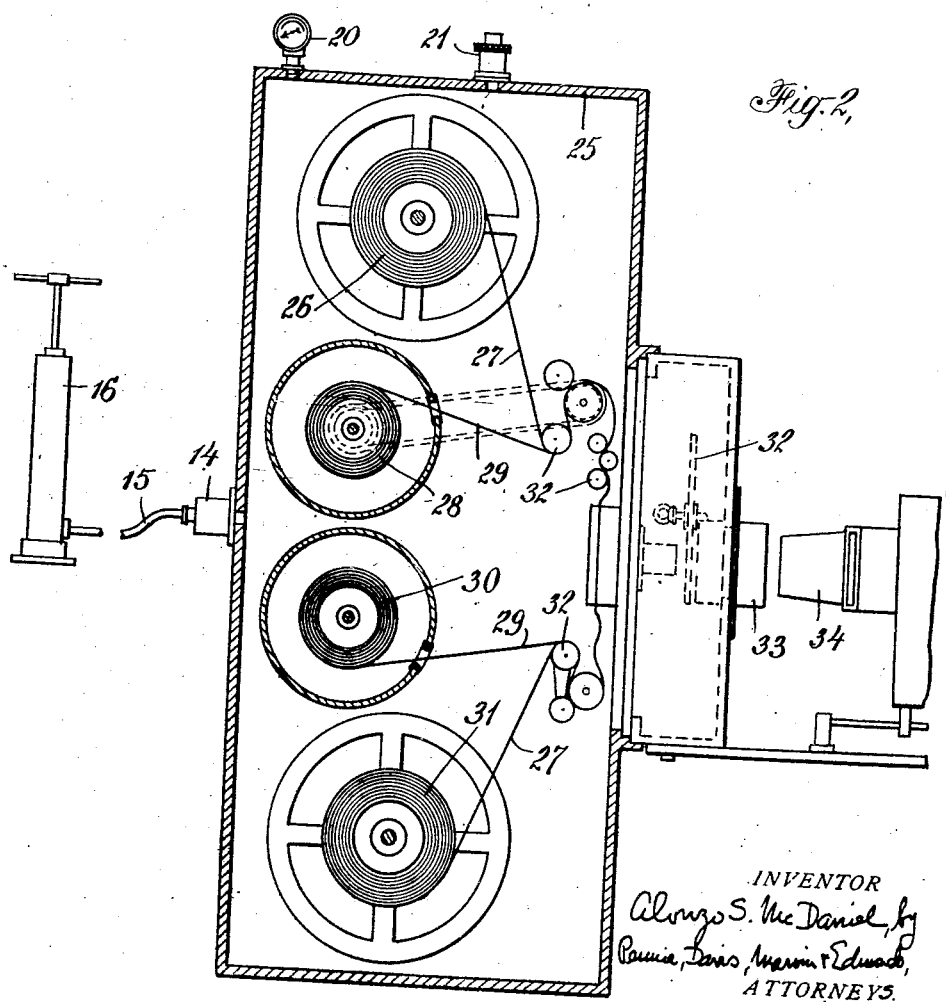

Referring more particularly to the drawings, Fig. 1, is a sectional view through a motion picture camera, and Fig. 2 is a sectional view through a printing machine used in printing positives from negatives in motion picture work.

Referring first to Fig. 1, 5 indicates a housing which is of fairly strong construction, sufficient to withstand a pressure say of 45 or 50 pounds gauge pressure. The rotating shutter 6 and the housings 7 for the lenses are preferably supported outside the front wall 8 of the housing.

The housing is, of course, gas-tight. On its interior it is provided with suitable brackets for supporting an upper reel 9 on which the unexposed film is wound and a lower reel 10 on which the exposed film is wound. The film itself is indicated at 12 and passes over various mechanisms 13 for properly guiding it during the step of exposure. Such mechanisms are well known in this art and form no part of my invention.

The gas under pressure or other dense gas may be introduced into the housing gas through an ordinary one-way valve, indicated generally at 14. The details of this valve form no part of this invention. Connected to the valve 14 by means of a tube 15 is a pump 16, by means of which air under pressure or other dense gas may be pumped to the housing. Obviously the gas could be introduced from an ordinary pressure tank if so desired. A pressure gauge 20 of any desired type is connected to the housing so as to indicate the pressure on the inside thereof. Safety or blow-off valve 21 of any desired type is also connected to the housings and is preferably made adjustable, so that it will blow off at any desired pressure.

Referring now to Fig. 2, this figure indicates an apparatus for employing the invention in printing motion picture film from a negative. 25 indicates a gas tight housing sufficiently strong to withstand a pressure of say 45 or 50 pounds, as a factor of safety, although probably pressures in the neighborhood of 30 lbs. could be used. Suitably supported within the housing is a reel 26 for holding the negative film 27, a reel 28 for holding a positive film 29, a reel 30 on which the positive film 29 is wound after printing, and a reel 31 on which the negative 27 is wound after printing. The positive and negative films are wound then unwound and controlled by suitable guides indicated generally at 32, which are well known in the art and which form no part of this invention. The shutter 32, lens holders 33, the source of light 34, and such accessories are preferably placed outside the gas-tight box.

This embodiment of the invention is provided with various pressure gauges, etc., as indicated in connection with Fig. 1 and are indicated by similar reference characters.

The above described mechanical apparatus is simply given by way of illustration and it should be understood that the invention is in no sense limited to the mechanical details here shown. In its broader aspect the invention consists simply in subjecting the film during whatever treatment it may be undergoing at the time, to a gas pressure greater than the ordinary atmospheric pressure or to a gas having a density greater than the density of ordinary air.

Having thus described my invention, I claim:

1. An apparatus for manipulating a photographic element and adapted to the prevention of so-called static markings on the photographic element during the manipulation thereof which comprises a substantially gas-tight compartment adapted to contain a gas having a density greater than the density of ordinary air and provided with means for manipulating the photographic element.

2. An apparatus for use in motion picture work and adapted to the prevention of so-called static markings on motion picture film which comprises a pressure compartment which is adapted to contain a gas at a pressure above atmospheric pressure, and means in said pressure compartment for allowing exposure or printing of the film in the usual way.

3. An apparatus for use in exposing or printing motion picture film and adapted to the prevention of so-called static markings on the film which comprises a pressure compartment, means in the pressure compartment for supporting the film before and after its exposure, the pressure compartment being provided with a valve through which the gas may be introduced under pressure.

4. The method of manipulating light-sensitive material which comprises maintaining an atmosphere of gas having a density greater than air around the light-sensitive material during the manipulation thereof whereby so-called static markings thereon are prevented.

5. The method of manipulating photographic film which comprises maintaining an atmosphere of gas under a pressure of about 30 lbs. per sq. in., surrounding the film, during the manipulation thereof, whereby so-called static markings on the film are prevented.

6. The method of manipulating motion picture film, which comprises keeping the film in an atmosphere of ordinary air under a pressure greater than atmospheric pressure during the manipulation of the film, whereby so-called static markings on the film are prevented.

7. The method of manipulating motion picture film which comprises keeping the film in an atmosphere of ordinary air under a pressure of about 30 lbs. per sq. in. greater than ordinary atmospheric pressure, during the manipulation of the film, whereby so-called static markings on the film are prevented.

In testimony whereof I affix my signature.

ALONZO S. McDANIEL.